(12) United States Patent
Yun

(10) Patent No.: US 7,669,812 B2
(45) Date of Patent: Mar. 2, 2010

(54) STAND FOR DISPLAY DEVICE (75) Inventor: Kum Young Yun, Busan-si (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 11/706,197

(22) Filed: Feb. 15, 2007

(65) Prior Publication Data
US 2007/0228253 A1 Oct. 4, 2007

(30) Foreign Application Priority Data
Feb. 17, 2006 (KR) .................. 10-2006-0015878

(51) Int. Cl.
F16M 11/00 (2006.01)
(52) U.S. Cl. .............. 248/162.1; 248/161; 248/404; 248/919; 248/682
(58) Field of Classification Search ............ 361/681; 248/121, 123.11, 133
See application file for complete search history.

(56) References Cited

U.S. PATENT DOCUMENTS 7,258,311 B2 * 8/2007 Yen et al. ............... 248/133
2005/0247832 A1 11/2005 Cho et al.
2006/0000956 A1 1/2006 Cvek
2007/0040077 A1 * 2/2007 Baek et al. .............. 248/133
2007/0145203 A1 6/2007 Takada et al.
2007/0272809 A1 * 11/2007 Jang ....................... 248/133
2007/0278362 A1 * 12/2007 Lee ........................ 248/133

FOREIGN PATENT DOCUMENTS

| EP | 1 382 897 A2 | 1/2004 |
|----|--------------|--------|
| JP | 2004-333744 A | 11/2004 |
| WO | WO-2004/079699 A1 | 9/2004 |

* cited by examiner

Primary Examiner—J. Allen Shriver, II
Assistant Examiner—Alaeddin Mohseni
(74) Attorney, Agent, or Firm—Birch, Stewart, Kolasch & Birch, LLP (57) ABSTRACT A stand for a display device that adjusts the height and tilt of the display device in a variety of ways to increase user convenience is provided. The stand includes a sliding portion, a supporting portion, and a base. The sliding portion extends toward a rear surface of the display device. The supporting portion slidably supports the sliding portion. The base extends the supporting portion upward. The sliding portion and the supporting portion are formed to extend in mutually different directions.

16 Claims, 8 Drawing Sheets

STAND FOR DISPLAY DEVICE

BACKGROUND OF THE INVENTION

1. Field of the Invention

The present invention relates to a stand for a display device, and more particularly, to a stand for a display device that allows the display device to be conveniently adjusted to any one of a variety of positions desired by a user. Still more particularly, the stand for a display device has a wide height adjusting range.

2. Description of the Related Art

Monitors are representative examples of display devices, and are capable of being adjusted to a variety of positions to suit users' preferences. In order to conveniently move such display devices, stands with quadric crank mechanism to conveniently adjust angles of display devices are provided in the related art. A stand for a display device employing the quadric crank mechanism structure allows the tilt angle of the display device to remain unchanged when the position of the display device is altered, thereby increasing the level of user convenience.

However, in a display device stand employing the quadric crank mechanism according to the related art, the process of adjusting the position of the display device can only be performed by changing the center of gravity of the stand by pivoting the stand. Therefore, adjusting the position of the display device is limited to pivoting the display device about the base of the stand.

Also, due to a limit in the amount by which the height of the display can be adjusted, functional versatility of the stand is reduced.

SUMMARY OF THE INVENTION

Accordingly, the present invention is directed to a stand for a display device that substantially obviates one or more problems due to limitations and disadvantages of the related art.

An object of the present invention is to provide a stand for a display device capable of adjusting the height of the display device in various ways, and facilitating the adjustment of the display device's position to increase user convenience.

Another object of the present invention is to provide a stand for a display device capable of raising the display device higher than in the related art, further increasing user convenience.

A further object of the present invention is to provide an inexpensive stand for a display device capable of changing and adjusting the position of the display device in various ways.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand for a display device, including: a sliding portion extending toward a rear surface of the display device; a supporting portion for slidably supporting the sliding portion; and a base extending the supporting portion upward, wherein the sliding portion and the supporting portion are formed to extend in mutually different directions.

In another object of the present invention, there is provided a stand for a display device, including: a rear fixing portion fixed to a rear surface of the display device; a sliding portion extending rearward while supported on the rear fixing portion; a supporting portion for supporting an extended end of the sliding portion; and a base for supporting a lower end of the supporting portion, wherein the sliding portion includes a quadric crank mechanism, the quadric crank mechanism for maintaining a tilt angle of the display device when a force below a predetermined level is applied to the display device.

In a further object of the present invention, there is provided a stand for a display device, including: a sliding portion supported at one end thereof on the display device; a supporting portion for supported an opposite end of the sliding portion; and a base for supporting the supporting portion, wherein the sliding portion includes: a first connecting portion provided at a region where the display device and the sliding portion are connected; a second connecting portion provided at a region where the supporting portion and the sliding portion are connected; at least two hinges provided respectively on the first connecting portion and the second connecting portion; main link providing components for forming a body of the sliding portion; and an auxiliary link for maintaining a tilt angle of the display device through pivoting the hinges at respectively same angles, in response to an external force below a predetermined level.

As described, the stand of the display device according to the present invention is capable of adjusting the position of the display device in a variety of ways to suit a user's requirements, and prevents the tilt angle of the display device from changing while a user adjusts the position of the display device. Thus, the level of user convenience increases. In particular, the range in which the height of the display device can be adjusted is increased.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6 through 8 are side views for describing operating modes of a stand according to the present invention, where

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
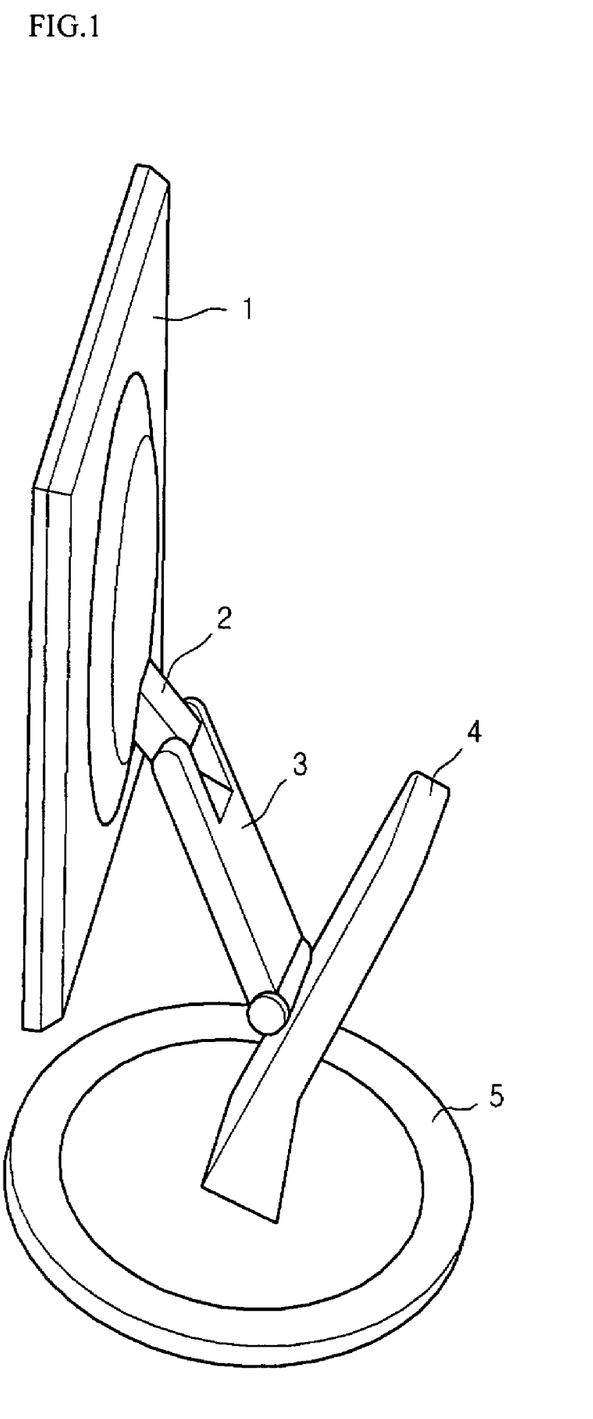
FIG. 1 is a perspective view of a display device stand according to the present invention.

FIG. 1 is a perspective view of a display device stand according to the present invention.

Referring to FIG. 1, a stand according to the present invention includes a display device 1 mounted thereon, a rear fixing portion 2 fixed to the rear of the display device 1, a sliding portion 3 extending approximately downward from the rear fixing portion 2, a supporting portion 4 for supporting the lower end of the sliding portion 3 and guiding the movement of the sliding portion 3 in a downward direction, and a base 5 supporting the lower end of the supporting portion 4 and supporting the display device 1 on a flat surface.

Because the point connecting the rear fixing portion 2 to the sliding portion 3 and the point connecting the sliding portion 3 to the supporting portion 4 are hinge connections, the connecting points allow each of the members to which they are connected to pivot. Because of their ability to pivot on the hinges, the members may be collectively manipulated by a user to conveniently achieve a desired position of the display device.

Also, because a quadric crank mechanism structure is provided inside the sliding portion 3, when the sliding portion 3 is pivoted, the tilt angle of the display device 1 is maintained. Through this adjustment, a user can conveniently adjust the height of the display device 1 while maintaining the original tilt angle of the display device 1.

While the lower end of the sliding portion 3 is supported by the supporting portion 4, the lower end is capable of being slid along the extended length of the supporting portion 4. Therefore, when a user wishes to adjust the height of the display device 1, the user may move the sliding portion 3 vertically along the supporting portion 4 to conveniently adjust the height of the display device 1.

Each position adjusting operation of the above display device will be described in detail at a later point with reference to FIGS. 6 through 8.

Below a detailed description of the structure of the display device stand according to the present invention will be provided.

Figure 2:
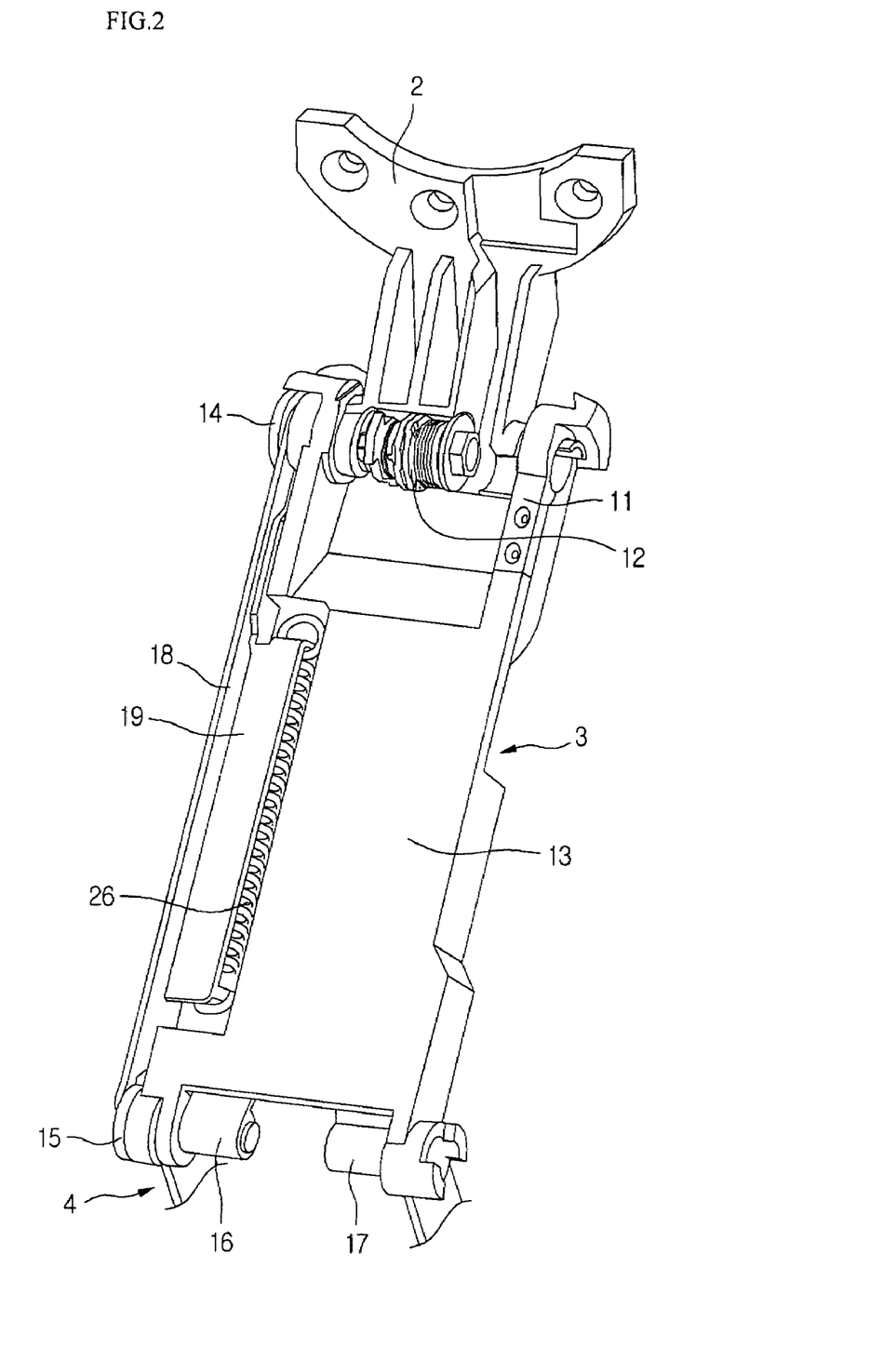
FIG. 2 is a perspective view of a sliding portion according to the present invention.
Figure 3:
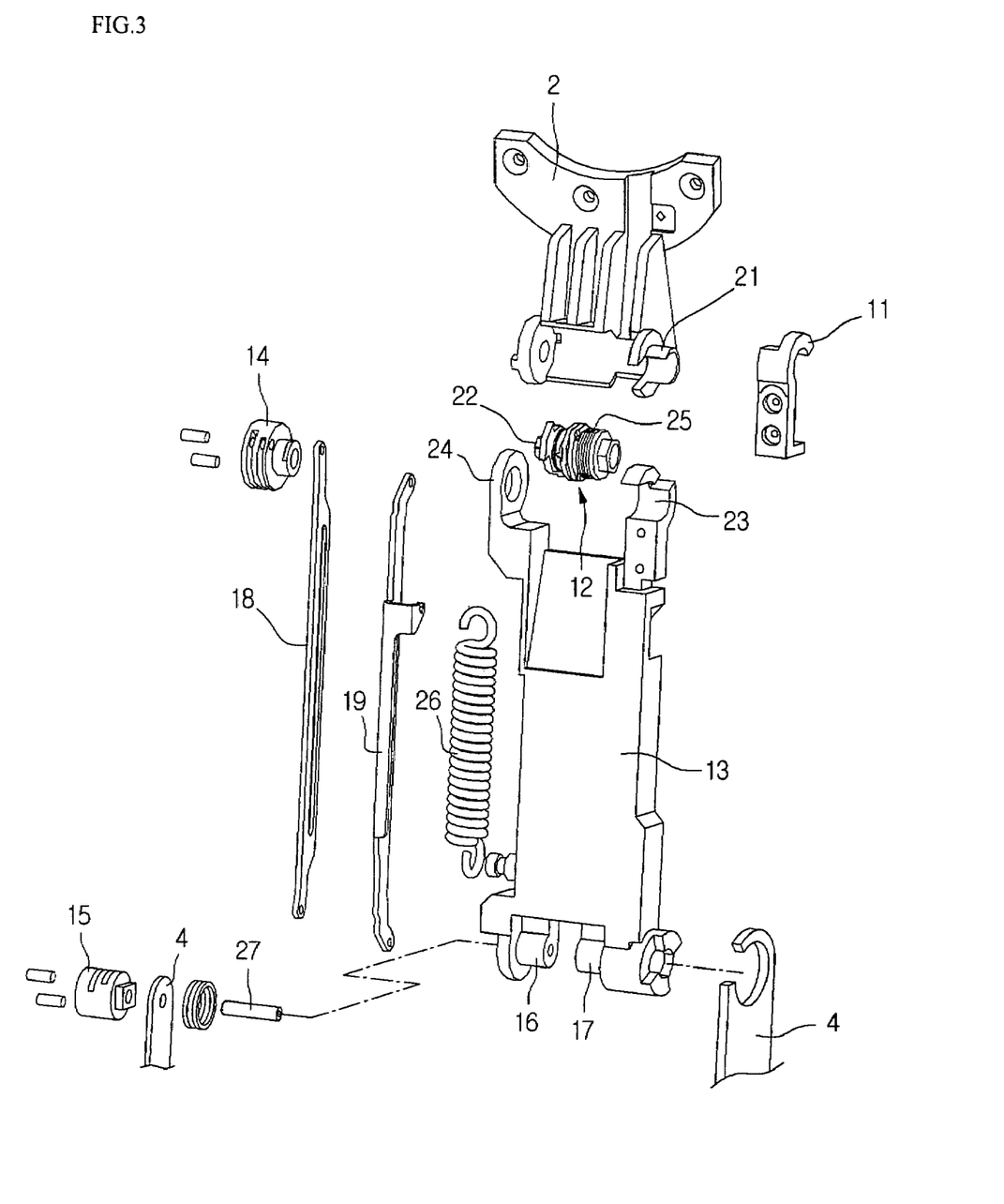
FIG. 3 is an exploded perspective view of a sliding portion according to the present invention.

FIG. 2 is a perspective view of a sliding portion according to the present invention, and FIG. 3 is an exploded perspective view of a sliding portion according to the present invention.

Referring to FIGS. 2 and 3, the sliding portion 3 includes a first connecting portion connecting an upper end of the sliding portion 3 to the rear fixing portion 2, a second connecting portion connecting the lower end of the sliding portion 3 to the supporting portion 4, and a link portion connecting the first connecting portion to the second connecting portion.

In further detail, the link portion includes a main link 13 linking the first connecting portion to the second connecting portion and imparting a predetermined connecting force therebetween, and an auxiliary link consisting of auxiliary link bars 18 and 19 disposed at one side of the main link 13 and acting as a quadric crank mechanism. The upper ends of the auxiliary link bars 18 and 19 act as the pivoting center of the link and are connected at respectively different and eccentric dispositions to the center of rotation of a link hinge 14. The lower portion of the auxiliary link bars 18 and 19 are connected at respectively different and eccentric dispositions to the center of rotation of a supporting hinge 15. Thus, in this structure, the auxiliary link bars 18 and 19, the link hinge 14 and the supporting hinge 15 may function as a quadric crank mechanism.

The quadric crank mechanism provides a parallelogram structure, wherein when one edge is fixed and the edge opposite thereto is moved, the opposite edge moves parallelly with the one edge. Thus, this characteristic of a quadric crank mechanism can maintain the same tilt angle of the display device 1 when the sliding portion 3 is pivoted.

Specifically, the first connecting portion includes a hinge spring member 12 provided with a first hinge axis 21 formed at the lower end of the rear fixing portion 2 and a second hinge axis 22. The first hinge axis 21 and a hinge spring member 25 allow the first connecting portion to perform two types of pivoting operations.

A detailed description of the structure of the first connecting portion will be given below. First, the first hinge axis 21 is guided by a first hinge receiving portion 23 formed on the upper portion of the main link 13, and is covered and supported by the hinge coupling portion 11. Therefore, the first hinge axis 21 can rotate while being guided by the first hinge receiving portion 23.

Also, with the hinge spring 25 placed on the first hinge axis 21, the second hinge axis 22 is coupled to the link hinge 14 through a second hinge receiving portion 24. Two members that are capable of rotating with respect to one another are provided inside the hinge spring member 12. The two members are connected through the hinge spring 25. One of the two members is fixed to the second hinge axis 22 and rotates together with the link hinge 14. The other of the two members is fixed to the first hinge axis 21 and rotates together with the rear fixing portion 2. Of course, a washer or other member for providing friction is provided within the hinge spring member 12. The friction provided by the washer or other friction providing member between the two members inside the hinge spring member 12 is greater than the friction provided between the first hinge axis 21 and the first hinge receiving portion 23.

The operation of the first connecting portion will now be described.

First, when a user moves the display device 1 in order to adjust its height, the link hinge 14 of the quadric crank mechanism rotates about the supporting hinge 15. However, the link hinge 14 does not rotate due to the operation of the quadric crank mechanism, and performs only orbital movement about the supporting hinge 15. Thus, the second hinge axis 22 fixedly connected to the link hinge 14 also moves only in an orbiting fashion.

In this state, the friction provided by the washer or other friction providing member between the two inner members in the hinge spring member 12 is greater than the friction provided between the first hinge axis 21 and the first hinge receiving portion 23. Therefore, the two members inside the hinge spring member 12 do not rotate relative to each other, and the hinge spring member 12 rotates together with the first hinge axis 21. Instead, rotation occurs between the first hinge axis 21 and the first hinge receiving portion 23, so that the main link 13 and the rear fixing portion 2 rotate differently. Thus, the display device 1 fixed to the rear fixing portion 2 rotates with respect to the main link 13.

This rotation causes the tilt angle of the display device 1 to remain the same throughout a pivoting of the sliding portion 3 at a lower end thereof. Therefore, the user can always view the display device 1 at the same tilt angle.

However, when a user wishes to adjust only the tilt angle of the display device 1, a substantial amount of force must be applied to the display device 1 to rotate the two members inside the hinge spring member 12 and adjust the tilt angle of the display device 1 itself.

The structure and operation of the second connecting portion will now be described.

The second connecting portion is a component formed between the sliding portion 3 and the supporting portion 4, and includes a first supporting axis 27, a supporting hinge 15 inserted sequentially in the first supporting axis 27, a supporting portion 4, a lower portion of the main link 13, and a first friction portion 16. Also, the first friction portion 16 is fixed with respect to the first supporting axis 27. Furthermore, at least one side thereof contacts the lower surface of the main link 13 and provides force pressing the main link 13 in an upward direction when the main link 13 rotates downward. This also applies to the second friction member 17. Here, the first friction member 16 and the second friction member 17 are able to provide sufficient restoring force in any direction, when the display device 1 moves upward or downward due to the wound directions being different with respect to the first supporting axis 27.

Also, the first supporting axis 27 is inserted so that is cannot rotate with respect to the supporting hinge 15. For this, the first supporting axis 27 that is inserted in the supporting hinge 15 may have a portion thereof formed in a non-circular shape. Also, the first supporting axis 27 is fixed with respect to the first friction portion 16.

The contacting region between the supporting portion and the first supporting axis 27 is supported by a first frictional force, and a predetermined second frictional force supports the contacting region between the lower end of the main link 13 and the first supporting axis 27. Here, the first frictional force is made to be greater than the second frictional force. Therefore, under normal conditions, when an external force is applied to the display device 1 to rotate the main link 13, the first supporting axis 27 and the lower end of the main link 13 rotate against each other. In this case, the tilt angle of the display device 1 is maintained while the height of the display device 1 is adjusted. Conversely, when a user wishes to change only the height of the main link 13, that is, only the tilt angle of the main link without maintaining the tilt angle of the display device 1, a substantial level of force is exerted to rotate the supporting portion 4 against the first supporting axis 27 to change the degree of twist between the supporting portion 4 and the supporting hinge 15.

An elastic member 26 is connected between the second supporting link 19 and the main link 13, so that when a user pivots the main link 13, the elastic member 26 exerts a force in a predetermined direction against the main link 13. Specifically, the auxiliary link 19 is connected at an eccentric disposition to the center of the rotating axis of the main link 13, so that the elastic member 26 expands and generates elasticity when the main link 13 is rotated. This elasticity is a force for returning the main link 13 and the auxiliary link 19 to their original positions. For example, when the restoring force of the elastic member 26 is applied in a direction in which the main link 13 rises, the deadweight of the display device 1 may be supported by means of the force.

Below, the relationship between the supporting portion and the sliding portion will be described in detail.

Figure 4:
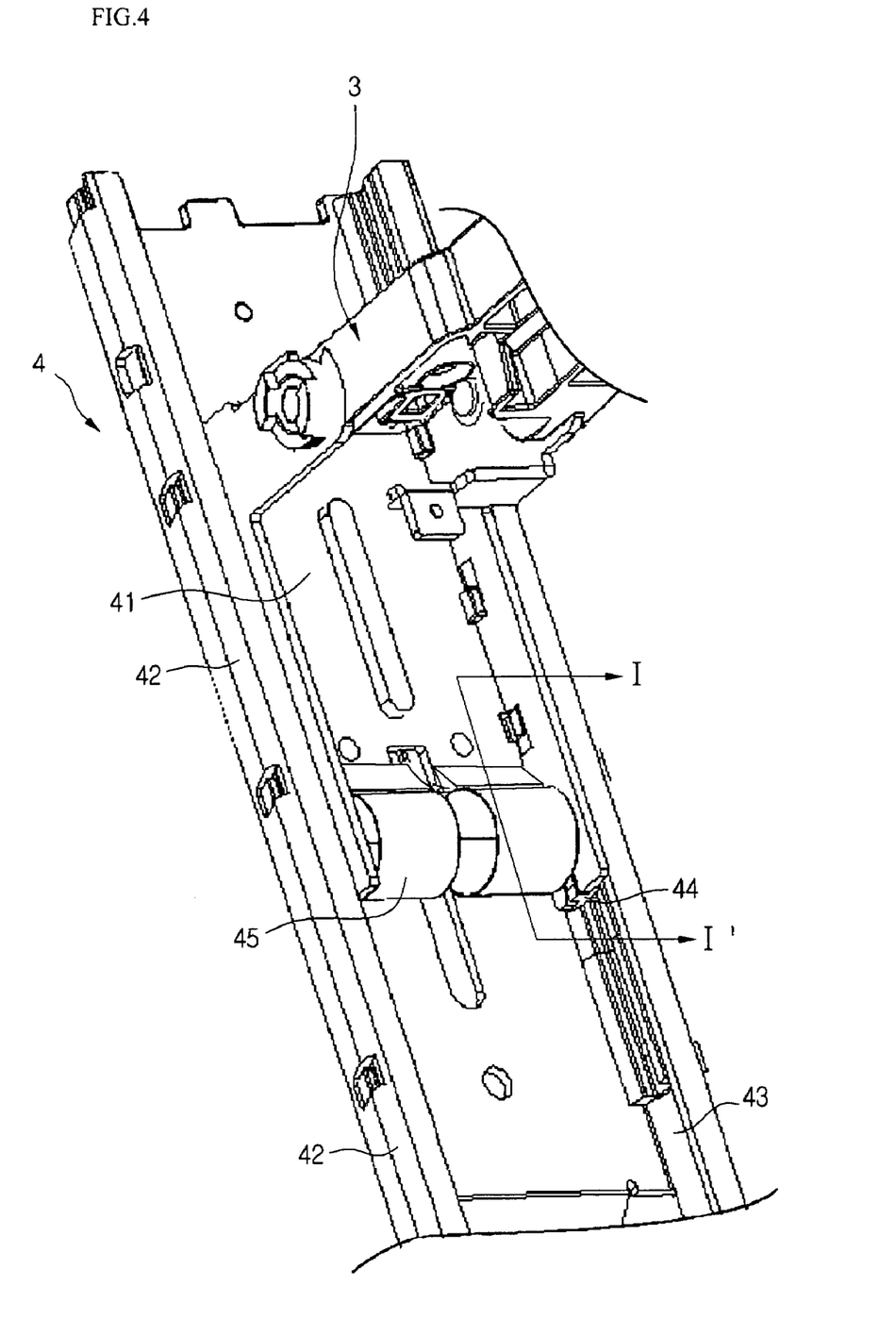
FIG. 4 is a frontal perspective view of a supporting portion according to the present invention.
Figure 5:
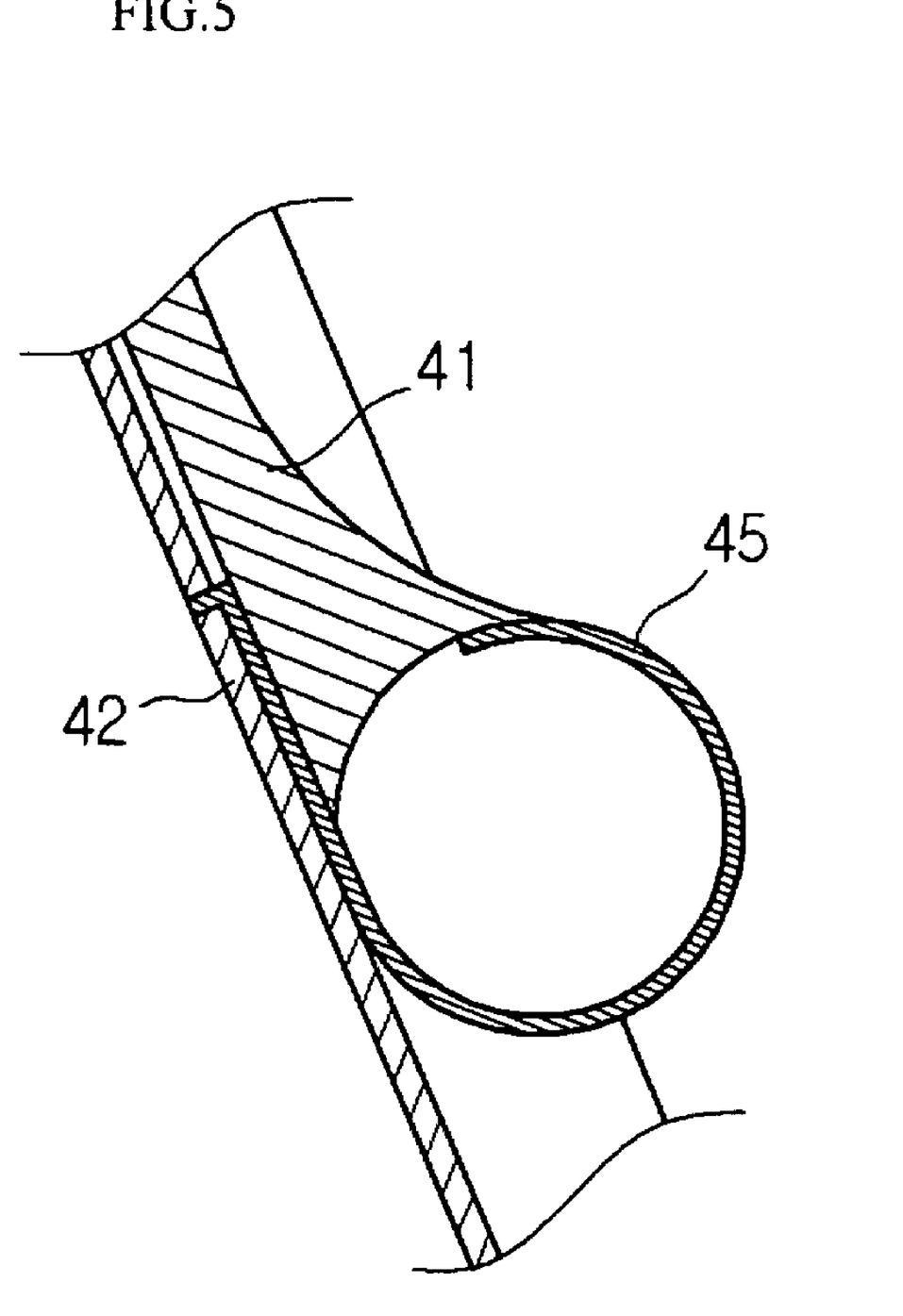
FIG. 5 is a sectional view of the supporting portion in FIG. 4 taken along line I-I'.

FIG. 4 is a frontal perspective view of a supporting portion according to the present invention, and FIG. 5 is a sectional view of the supporting portion in FIG. 4 taken along line I-I'.

Referring to FIGS. 4 and 5, the supporting portion 4 includes a guide panel 42 forming a frame thereof, a slide panel 41 along which the guide panel 42 moves in an extending direction, and a plate spring 45 for supporting the movement of the slide panel 41 with the guide panel 42 in a fixed state.

Also, a guide protrusion 44 is formed on a side of the slide panel 41, and an extending slot 43 is formed at the location of the guide panel 42 opposite to the guide protrusion 44.

The operation of the supporting portion 4 in the above structure will now be described. First, when a user exerts force on the sliding portion 3 in a downward direction, the slide panel 41 pushes the plate spring 45 to unwind the plate spring 45. Here, the plate spring 45 provides drag preventing the slide panel 41 from descending, so that the deadweight of the display device 1 can be conveniently raised in an upward direction. Also, friction is applied to the plate spring 45 so that when the slide panel 41 attains a predetermined height, the display device 1 is stably supported.

In order for the plate spring 45 to perform the above function, one end of the plate spring 45 is fixed to the guide panel 42, and the other end is wound at a predetermined curvature and put in contact with the slide panel 41.

Because the guide protrusion 44 is able to move only within the extending slot 43, the vertical movement of the slide panel 41 is guided by the guide panel 42. Of course, in order to ensure that the slide panel 41 does not disengage from the top end or bottom end of the guide panel 42, the top and bottom ends of the guide panel may form a predetermined stopper.

The structure of the above display device stand according to the present invention has been sufficiently explained. Below, the operation of the stand according to the present invention will be described.

Figure 6:
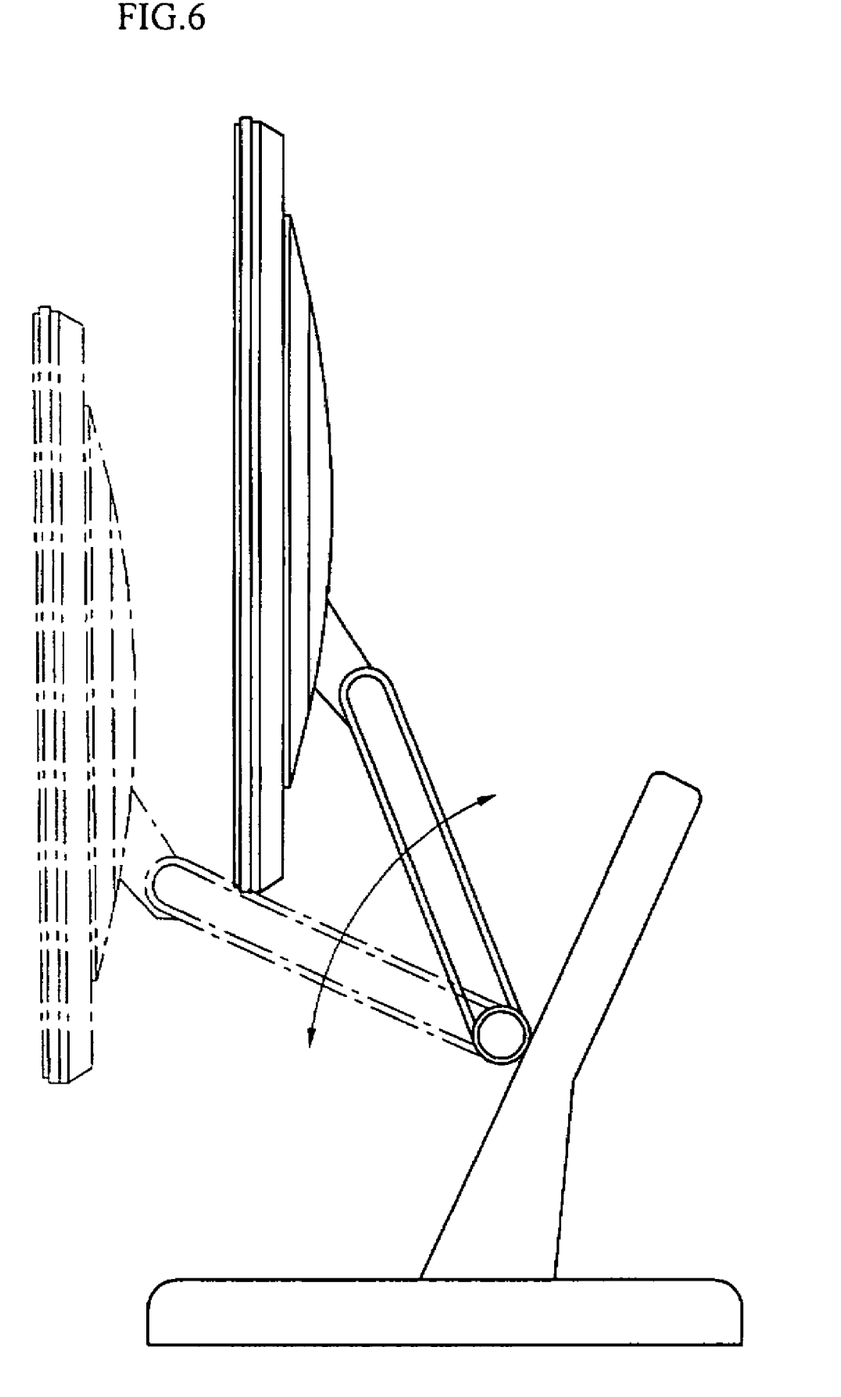
FIG. 6 shows an operating mode in which the tilt angle of the display device is maintained while moving the display device vertically.
Figure 7:
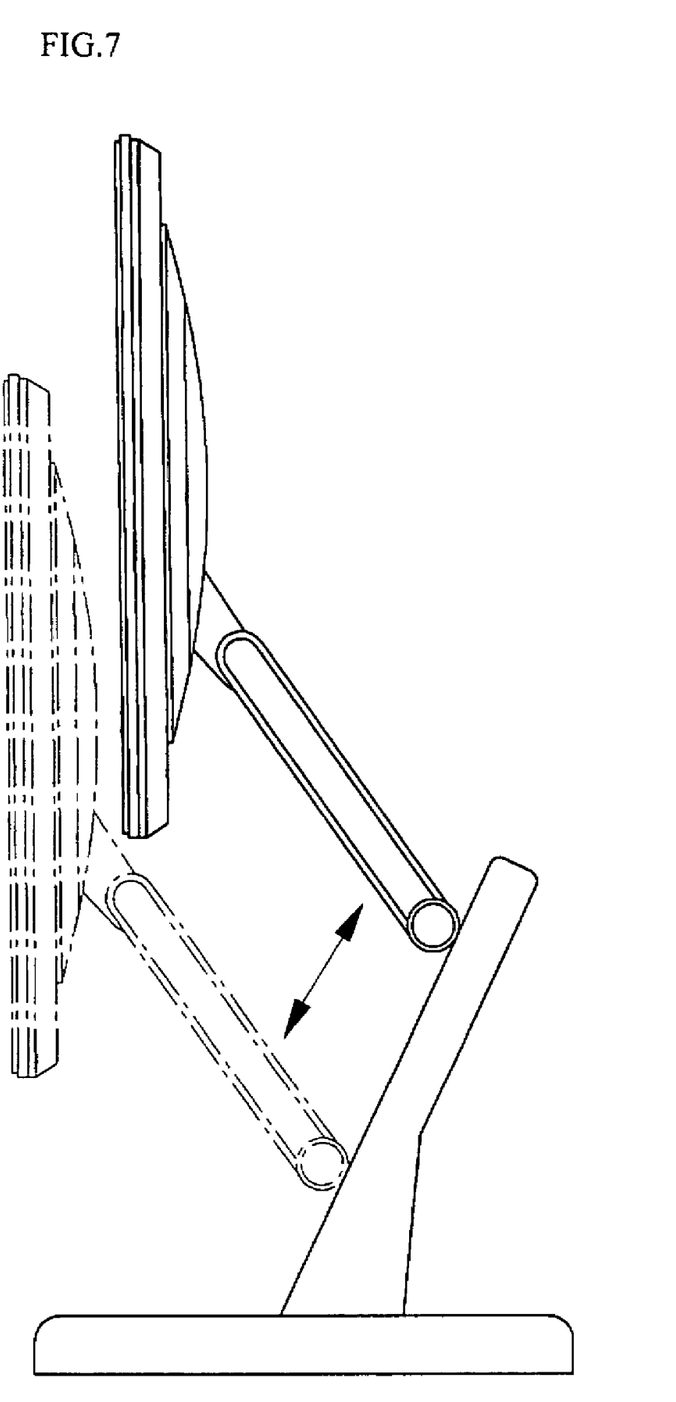
FIG. 7 shows an operating mode in which a sliding portion moves vertically along a supporting portion.
Figure 8:
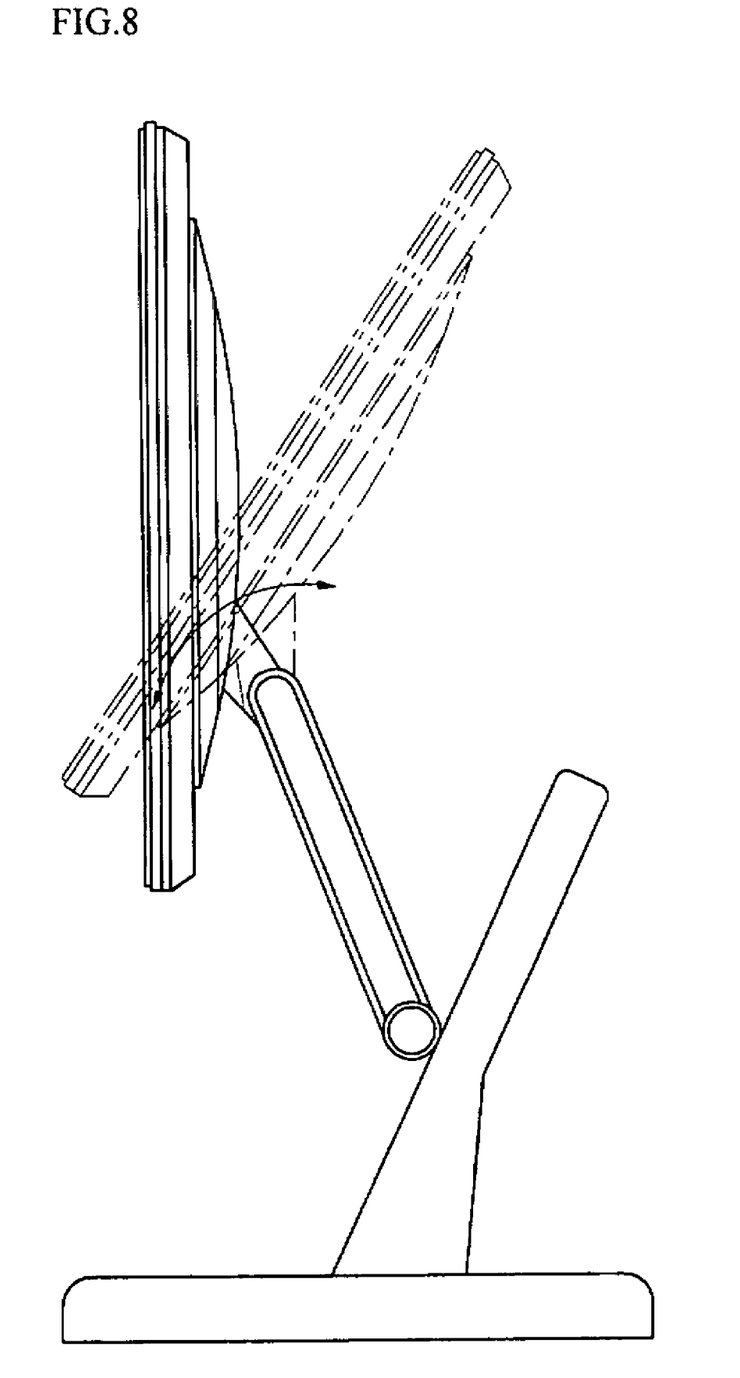
FIG. 8 shows an operating mode in which the display device itself is pivoted.

FIGS. 6 through 8 are side views for describing operating modes of a stand according to the present invention, where FIG. 6 shows an operating mode in which the tilt angle of the display device is maintained while moving the display device vertically.

Referring to FIG. 6, when a user applies a relatively weak force to the display device 1, the sliding portion pivots about the second connecting portion connecting the sliding portion 3 and the supporting portion 4. Here also, the quadric crank mechanism provided within the sliding portion 3 maintains the tilt angle of the display device 1 in its original position.

This operational mode may be used in order to retain the viewing angle at which a user views the display device while moving the display device forward or backward.

FIG. 7 shows an operating mode in which a sliding portion moves vertically along a supporting portion. Referring to FIG. 7, while the plate spring 45 supports the deadweight of the display device 1, a user may adjust the height of the display device 1 by raising or lowering the same along an extending direction of the supporting portion 4.

In the case of this operating mode, because the display device 1 and the sliding portion 3 are elevated together, the display device 1 may be adjusted to a height greater than in the related art.

FIG. 8 shows an operating mode in which the display device itself is pivoted. Referring to FIG. 8, because the two members provided within the hinge spring member 12 are rotated, the angle at which a user views the display device may be tilted.

In the case of this operating mode, because the viewing angle of the display device 1 may be adjusted with more precision and accuracy, the viewing angle of the display device can be adjusted to an angle at which the picture is clearest.

Each operating mode shown in FIGS. 6 through 8 may be performed separately or in combination.

As described, the height and tilt angle adjustments of the display device according to the present invention allow for a wide range of adjustments, so that the position of the display device can be easily adjusted, providing users with increased convenience.

Also, because the structure of the display device is made simple, a wide assortment of operating modes are possible. Thus, the product can be inexpensively manufactured.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand for a display device, comprising:
   a sliding portion extending toward a rear surface of the display device;
   a supporting portion for slidably supporting the sliding portion; and
   a base extending the supporting portion upward, wherein the sliding portion and the supporting portion are formed to extend in mutually different directions;
   the sliding portion having a quadric crank mechanism, the quadric crank mechanism comprising:
      a link hinge providing a hinge connection between the sliding portion and the display device;
      a supporting hinge providing a hinge connection between the sliding portion and the supporting portion;
      a pair of auxiliary links eccentrically connecting the link hinge to the supporting hinge;
      a main link connecting the link hinge and the supporting hinge; and
      a elastic member connected between one of the auxiliary links and the main link so that the main link is pivoted, the elastic member exerting a restoring force in a predetermined direction against the main link,
      wherein when an external force is applied to the display device, the display device is orbited while maintaining a tilt angle thereof, prior to a changing of the tilt angle of the display device.

2. The stand according to claim 1, wherein the sliding portion and a connecting portion of the display device are respectively capable of rotating.

3. The stand according to claim 1, wherein a lower end of the sliding portion is supported by a frictional force against the supporting portion.

4. The stand according to claim 1, wherein the supporting portion supports a lower end of the sliding portion.

5. The stand according to claim 1, wherein the supporting portion comprises:
   a slide panel to which a lower end of the sliding portion is coupled; and
   a guide panel along which the slide panel is guided and moves in an extending direction of the supporting portion.

6. The stand according to claim 5, wherein the supporting portion further comprises:
   an extending slot formed in an extending direction of the guide panel; and
   a guide protrusion protruding from the slide panel, for being guided by the extending slot.

7. The stand according to claim 5, wherein the supporting portion further comprises a spring capable for expanding and contracting while contacting the slide panel, and having at least one end thereof fixed to the guide panel.

8. The stand according to claim 7, wherein at least a portion of the spring contacting the slide panel is wound; and
   the one side of the slide panel which contacts with a wounded portion of the spring is formed in a round shape with respect to a curvature of the wounded portion of the spring.

9. The stand according to claim 1, wherein the supporting portion extends upward while reclined rearward with respect to the base.

10. The stand according to claim 1, wherein the sliding portion extends in a forward direction from the supporting portion.

11. The stand according to claim 1, wherein a surface guiding the sliding portion on the supporting portion is a front surface of the supporting portion.

12. A stand for a display device, comprising:
    a sliding portion supported at one end thereof on the display device;
    a supporting portion for supported an opposite end of the sliding portion; and
    a base for supporting the supporting portion, wherein the sliding portion includes:
       a first connecting portion provided at a region where the display device and the sliding portion are connected;
       a second connecting portion provided at a region where the supporting portion and the sliding portion are connected;
       at least two hinges provided respectively on the first connecting portion and the second connecting portion;
       a main link providing components for forming a body of the sliding portion;
       an auxiliary link for maintaining a tilt angle of the display device through pivoting the hinges at respectively same angles, in response to an external force below a predetermined level; and
       a elastic member connected between the auxiliary link and the main link so that when the main link is pivoted, the elastic member exerts a restoring force in a predetermined direction against the main link.

13. The stand according to claim 12, wherein the sliding portion extends rearward from the display device and forward from the supporting portion.

14. The stand according to claim 12, wherein the sliding portion is disposed to recline forward when extending upward, and the supporting portion is disposed to recline rearward when extending upward.

15. The stand according to claim 12, wherein the sliding portion slides along an extending direction of the supporting portion.

16. The stand according to claim 1, wherein the restoring force of the elastic member is configured to be applied in a direction which makes the main link is rotated in an opposite direction with respect to a direction of a deadweight of the display device.

* * * * *